(12) United States Patent
Shimokawa

(10) Patent No.: US 10,029,559 B2
(45) Date of Patent: Jul. 24, 2018

(54) FUEL TANK STRUCTURE

(71) Applicant: TOYOTA JIDOSHA KABUSHIKI KAISHA, Toyota-shi, Aichi-ken (JP)

(72) Inventor: Shinji Shimokawa, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/646,489

(22) PCT Filed: Nov. 20, 2013

(86) PCT No.: PCT/JP2013/081321
§ 371 (c)(1),
(2) Date: May 21, 2015

(87) PCT Pub. No.: WO2014/084103
PCT Pub. Date: Jun. 5, 2014

(65) Prior Publication Data
US 2015/0306951 A1  Oct. 29, 2015

(30) Foreign Application Priority Data
Nov. 27, 2012  (JP) .................................. 2012-259080

(51) Int. Cl.
*B60K 15/03* (2006.01)
*F02M 37/00* (2006.01)
*F02M 25/08* (2006.01)

(52) U.S. Cl.
CPC ............ *B60K 15/03* (2013.01); *F02M 25/089* (2013.01); *F02M 25/0836* (2013.01); *F02M 37/0082* (2013.01); *B60K 2015/03289* (2013.01); *B60K 2015/03368* (2013.01); *B60K 2015/03447* (2013.01)

(58) Field of Classification Search
CPC .......... B60K 15/03; B60K 2015/03289; B60K 2015/03447; B60K 2015/03368; G05D 7/0133
See application file for complete search history.

(56) References Cited

U.S. PATENT DOCUMENTS

| | | | | |
|---|---|---|---|---|
| 4,867,200 A * | 9/1989 | Markley | ................ | F16K 15/028 137/515.7 |
| 5,280,805 A * | 1/1994 | Skoglund | ............. | G05D 7/0133 137/504 |
| 5,813,434 A | 9/1998 | Horiuchi | | |
| 2011/0192382 A1* | 8/2011 | Ogaki | .................... | B60K 15/00 123/518 |
| 2011/0220071 A1* | 9/2011 | Horiba | ............... | F02M 25/0836 123/520 |

(Continued)

FOREIGN PATENT DOCUMENTS

JP  H09-112373 A  4/1997
JP  11193755 A * 7/1999

(Continued)

*Primary Examiner* — Hung Q Nguyen
*Assistant Examiner* — Xiao Mo
(74) *Attorney, Agent, or Firm* — Hunton Andrews Kurth LLP

(57) ABSTRACT

A flow inhibiting member that inhibits a flow of vapor is provided, between a full-tank regulating valve and a sealing valve, at a communication pipe that communicates a canister and a full-tank regulating valve of a fuel tank.

4 Claims, 13 Drawing Sheets

(56) References Cited

U.S. PATENT DOCUMENTS

| | | | | |
|---|---|---|---|---|
| 2011/0253110 A1* | 10/2011 | Fukui | .................... | F02D 41/004 |
| | | | | 123/520 |
| 2011/0284104 A1* | 11/2011 | Riano Gutierrez | .. | G05D 7/0133 |
| | | | | 137/517 |
| 2013/0298880 A1* | 11/2013 | Pifer | .................. | F02M 25/0836 |
| | | | | 123/520 |

FOREIGN PATENT DOCUMENTS

| | | |
|---|---|---|
| JP | 2010-281258 A | 12/2010 |
| JP | 2011-226308 A | 11/2011 |

\* cited by examiner

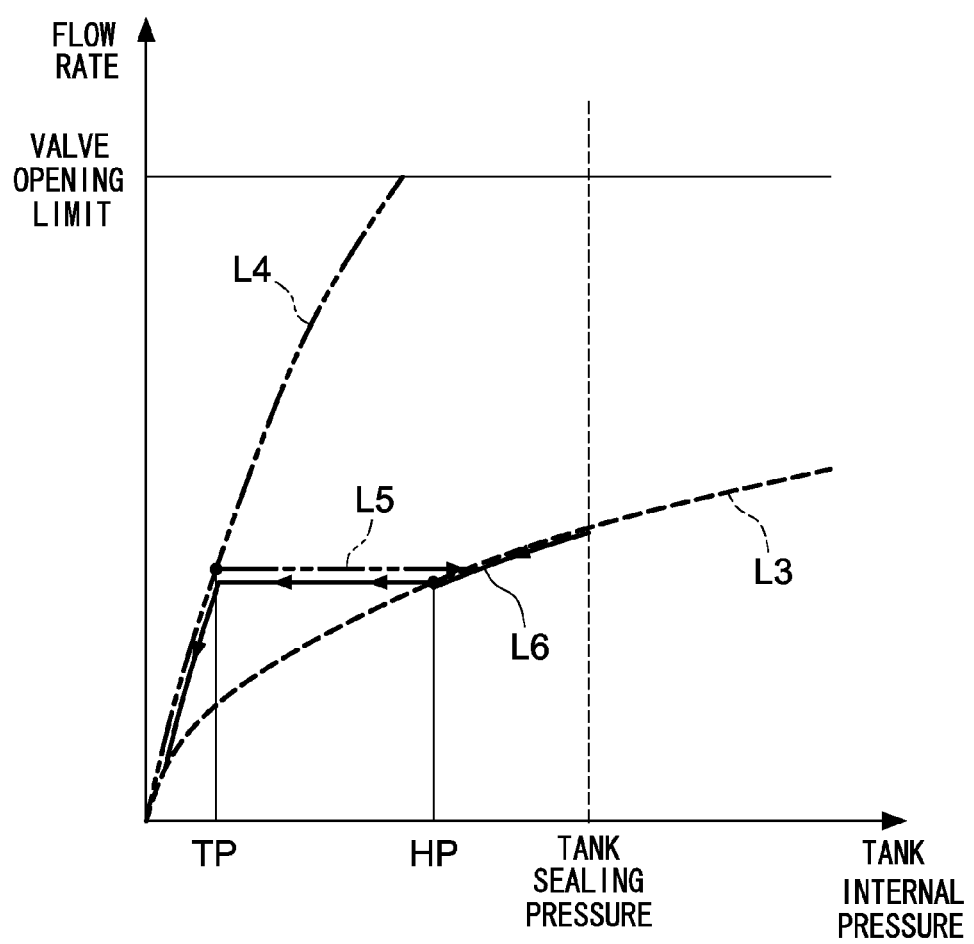

FUEL TANK STRUCTURE

CROSS-REFERENCE TO RELATED APPLICATIONS

This is a national phase application based on the PCT International Patent Application No. PCT/JP2013/081321 filed Nov. 20, 2013, claiming priority to Japanese Patent Application No. 2012-259080 filed Nov. 27, 2012, the entire contents of both of which are incorporated herein by reference.

TECHNICAL FIELD

The present invention relates to a fuel tank structure.

BACKGROUND ART

As a fuel tank structure, there is a structure (a so-called airtight tank) in which a sealing valve is provided between a fuel tank and a canister, and the fuel tank is sealed at times other than at times of refueling the fuel tank or times when the tank internal pressure exceeds a predetermined value (see, for example, Japanese Patent Application Laid-Open (JP-A) No. 2011-226308).

In such a fuel tank structure, when the sealing valve between the fuel tank and the canister is opened in a state in which the tank internal pressure within the fuel tank is high, the high tank internal pressure acts on a valve that regulates the full-tank state of the fuel tank (a full-tank regulating valve), and there is the concern that the full-tank regulating valve will close. When the full-tank regulating valve closes, vapor within the fuel tank cannot be moved toward the canister side, and therefore, refueling and releasing of pressure can no longer be carried out.

SUMMARY OF INVENTION

Technical Problem

In consideration of the above-described circumstances, the topic of the present invention is to obtain a fuel tank structure that can suppress closing of a full-tank regulating valve, even if a sealing valve between a fuel tank and a canister is opened in a state in which the tank internal pressure of the fuel tank is high.

Solution to Problem

A first aspect of the present invention comprises: a fuel tank that can accommodate fuel internally; a canister that adsorbs, by means of an adsorbent, evaporated fuel inside the fuel tank, and that, after adsorption of the evaporated fuel, releases vapor to the atmosphere; a full-tank regulating valve that is provided within the fuel tank, and that closes as a result of a float floating in the fuel when a fuel liquid surface within the fuel tank reaches a full-tank liquid level that is set in advance; a communication pipe that communicates the fuel tank with the canister via the full-tank regulating valve; a sealing valve that is provided at the communication pipe and that can open and close the communication pipe by control thereof; and a flow inhibiting member that is provided at the communication pipe and that inhibits flow of vapor at the communication pipe.

In this fuel tank structure, in the state in which the sealing valve is open, the fuel tank is communicated with the canister by the communication pipe. Therefore, vapor, that contains evaporated fuel, within the fuel tank can be moved to the canister. In contrast, in the state in which the sealing valve is closed, the fuel tank can be sealed.

Further, when the fuel liquid surface reaches the full-tank liquid level at the time of refueling the fuel tank, the float floats in the fuel, and the full-tank regulating valve closes. Therefore, vapor within the fuel tank is not discharged to the exterior, and the refueling fuel can be caused to reach the refueling gun from an inlet pipe or the like.

The flow inhibiting member is provided at the communication pipe, and the flow of vapor at the communication pipe is inhibited. Here, "inhibited" does not mean that the flow of vapor is completely stopped, and means that the flow rate is made lower than a case in which there is no flow inhibiting member, while a flow is still permitted.

Further, even if the sealing valve is open in the state in which the tank internal pressure of the fuel tank is high, vapor within the fuel tank flowing through the communication pipe toward the canister side is inhibited. Due thereto, an intermediate pressure region, at which the pressure is higher than atmospheric pressure and lower than the tank internal pressure, is structured within the communication pipe between the full-tank regulating valve and the flow inhibiting member. Namely, the pressure difference between the fuel tank side and the flow inhibiting member side of the full-tank regulating valve is small, and therefore, the float moving toward the valve closing side is suppressed, and closing of the full-tank regulating valve is suppressed.

In a second aspect of the present invention, in the first aspect, the flow inhibiting member comprises a variable mechanism that can change a flow path sectional area of the communication pipe.

By changing the flow path sectional area of the communication pipe by the variable mechanism, in a case in which, for example, the tank internal pressure exceeds the valve closing pressure of the full-tank regulating valve, the flow path sectional area is made small, and closing of the full-tank regulating valve is suppressed. In a case in which the tank internal pressure does not exceed the valve closing pressure of the full-tank regulating valve, the flow path sectional area is made large, and it is possible to devise smooth movement of vapor from the fuel tank toward the canister.

In a third aspect of the present invention, in the second aspect, the flow inhibiting member comprises an orifice member that locally reduces the flow path sectional area of the communication pipe.

Because the flow path sectional area of the communication pipe is locally reduced by the orifice member, the flow of vapor of the communication pipe can be inhibited. Further, by providing the orifice member, the flow inhibiting member can be realized by a simple structure.

In a fourth aspect of the present invention, in the third aspect, the orifice member comprises: a first orifice plate that is fitted tightly to an inner portion of the communication pipe, and that has a first orifice hole whose inner diameter is smaller than an inner diameter of the communication pipe; and a second orifice plate that is disposed further toward the full-tank regulating valve side than the first orifice plate, and that, when contacting the first orifice plate, blocks a portion of the first orifice hole, and that has one or more communication portions of which a portion is blocked in a state in which the second orifice plate contacts the first orifice plate; and the variable mechanism comprises an urging member that urges the second orifice plate toward the full-tank regulating valve side so as to move the second orifice plate away from the first orifice plate, and that, due to tank internal pressure of a predetermined value or greater that is applied from the fuel tank to the second orifice plate, can move the second orifice plate toward the first orifice plate side.

In a case in which the tank internal pressure that is applied from the fuel tank to the second orifice plate is less than a predetermined value, the second orifice plate is urged by the urging member and moves away from the first orifice plate. The communication portion of the second orifice plate is not blocked, and the first orifice hole also is not blocked, and therefore, the vapor of the fuel tank can move toward the canister side.

In a case in which the tank internal pressure that is applied from the fuel tank to the second orifice plate is greater than or equal to the predetermined value, the second orifice plate moves toward the first orifice plate side against the urging force of the urging member. Then, when the second orifice plate contacts the first orifice plate, a portion of the communication portion and a portion of the first orifice hole are blocked. Movement of vapor from the fuel tank toward the canister side occurs through the unblocked portion at the communication portion.

In this way, due to movement of the second orifice plate, the flow path sectional area of the communication pipe can be changed, and there is no need for a complex mechanism. Therefore, there is a highly reliable structure.

Advantageous Effects of Invention

Because the present invention has the above-described structure, closing of a full-tank regulating valve can be suppressed, even if a sealing valve between a fuel tank and a canister is opened in a state in which the tank internal pressure of the fuel tank is high.

BRIEF DESCRIPTION OF DRAWINGS

FIG. 7 is a graph qualitatively showing the relationship between tank internal pressure and flow rate in the second embodiment of the present invention.

DESCRIPTION OF EMBODIMENTS

Figure 1:
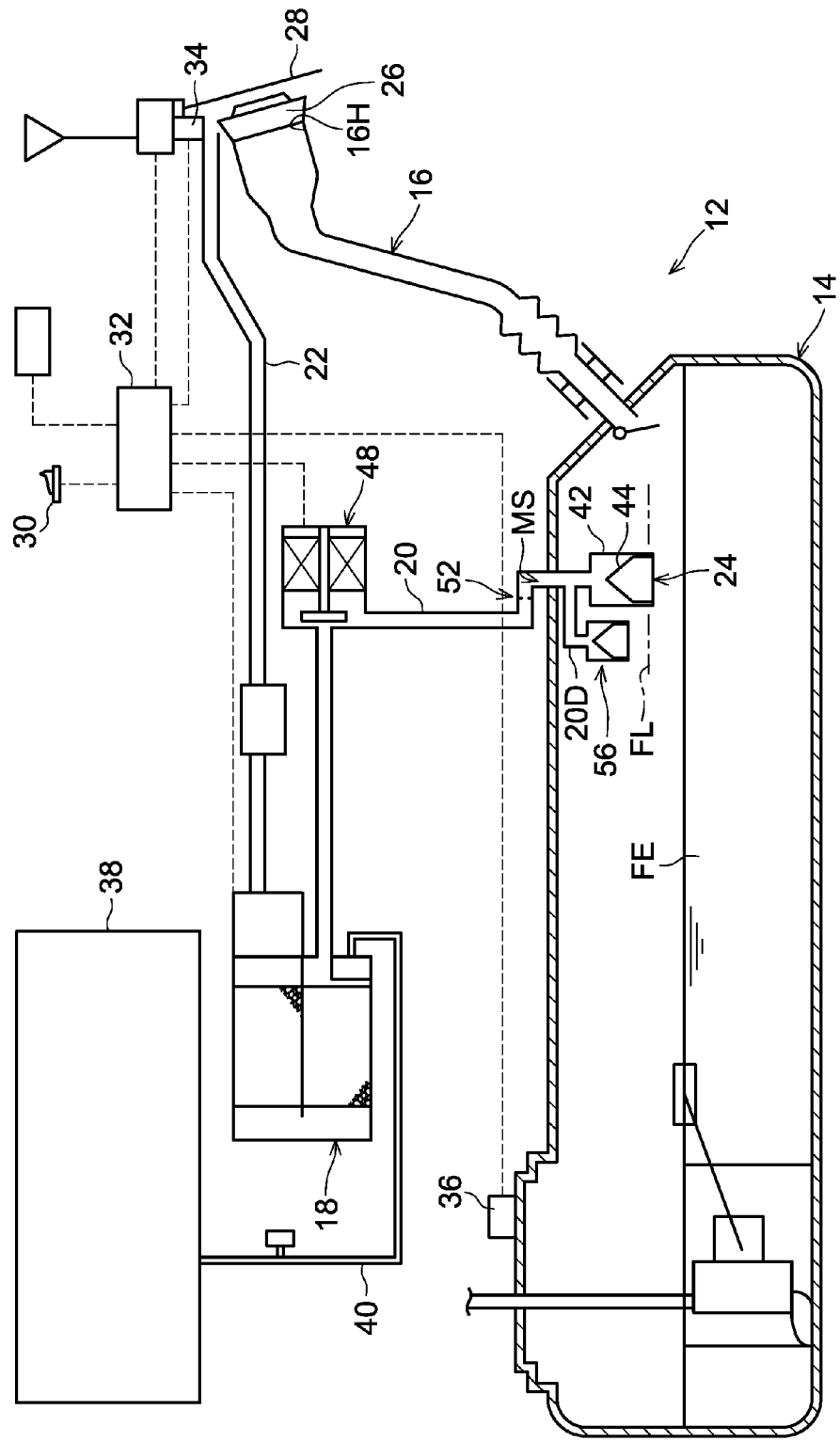
FIG. 1 is a schematic structural drawing showing a fuel tank structure of a first embodiment of the present invention.

A fuel tank structure 12 of a first embodiment of the present invention is shown in FIG. 1. Further, a full-tank regulating valve 24, that structures this fuel tank structure 12, and a vicinity of the full-tank regulating valve 24 are shown in a cross-sectional view in FIG. 2.

The fuel tank structure 12 has a fuel tank 14 that can accommodate fuel internally. The lower end portion of an inlet pipe 16 is connected to the upper portion of the fuel tank. The open portion of the upper end of the inlet pipe 16 is a refueling port 16H. A refueling gun is inserted into the refueling port 16H, and the fuel tank 14 can be refueled. The refueling port 16H of the inlet pipe 16 is usually opened and closed by a fuel cap 26, and, at times of refueling, the fuel cap 26 is removed by a refueling operator or the like.

A fuel lid 28 is provided at the further outer side of the fuel cap 26 at a panel of a vehicle body. When information that a lid opening switch 30, that is provided within the vehicle cabin or the like, has been operated is sent to a control device 32, the control device 32 opens the fuel lid 28 under a predetermined condition that is described later. The open/closed state of the fuel lid 28 is sensed by a lid open/closed sensor 34, and that information is sent to the control device 32.

A tank internal pressure sensor 36 is provided at the fuel tank 14. Information of the tank internal pressure that is sensed by the tank internal pressure sensor 36 is sent to the control device 32.

A canister 18 is provided at the exterior of the fuel tank 14. An adsorbent such as active carbon or the like is accommodated at the interior of the canister 18. A vapor layer at the interior of the fuel tank 14 and the canister 18 are connected by a communication pipe 20, and vapor within the fuel tank 14 can be made to flow into the canister 18. The evaporated fuel within the vapor that flows-in is adsorbed by the adsorbent of the canister 18, and the vapor other than that (the atmosphere component) is discharged out into the atmosphere from an atmosphere communication pipe 22.

The canister 18 and an engine 38 are connected by a purge pipe 40. Due to negative pressure of the engine 38 being applied to the canister 18 in a state in which a sealing valve 48 that is described later is closed, atmospheric air is introduced-in from the atmosphere communication pipe 22, and the evaporated fuel that has been adsorbed by the adsorbent can be separated (purged). The evaporated fuel that is separated is sent to and combusted at the engine 38.

The full-tank regulating valve 24 is provided at the lower end of the communication pipe 20 so as to be positioned at the upper portion of the fuel tank 14 interior. The full-tank regulating valve 42 is a so-called float valve, and has a float 44, that floats in fuel FE, within a valve housing 42 that is substantially tubular.

Figure 2:
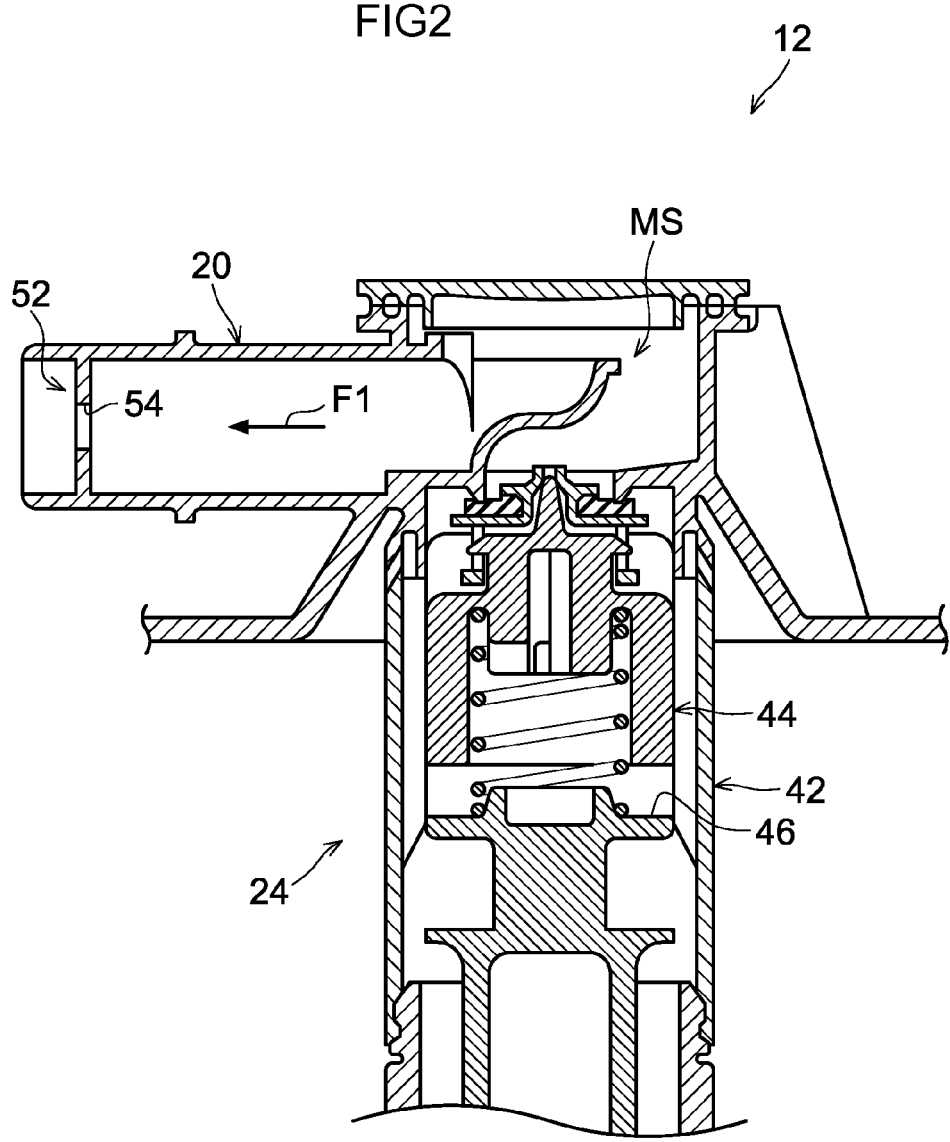
FIG. 2 is a cross-sectional view showing, in an enlarged manner, a full-tank regulating valve of the fuel tank structure of the first embodiment of the present invention, and a vicinity of the full-tank regulating valve.

Until the liquid surface of the fuel FE within the fuel tank 14 reaches a full-tank liquid level FL (see FIG. 1), the float 44 does not float in the fuel and is supported by a supporting portion 46. In contrast, when the fuel FE reaches the full-tank liquid level FL, as shown in FIG. 2, the float 44 of the full-tank regulating valve 24 enters into a state of floating in the fuel FE, and the full-tank regulating valve 24 enters into a closed state. In this state, because the communication pipe 20 also is blocked, movement of vapor from the fuel tank 14 through the communication pipe 20 to the canister 18 is impeded.

The sealing valve 48 is provided midway along the communication pipe 20. In the present embodiment, the sealing valve 48 is an electromagnetic valve, and the opening/closing thereof is controlled by the control device 32. In the open state of the sealing valve 48, vapor within the fuel tank 14 can move through the communication pipe 20 to the canister 18, and in the closed state of the sealing valve 48, this movement of vapor is not possible.

An orifice member 52 is fixed to the communication pipe 20 at a position between the full-tank regulating valve 24 and the sealing valve 48. As shown in FIG. 2, in the present embodiment, the orifice member 52 is formed in the shape of a disc that is continuous from the inner peripheral surface (or is fit tightly to the inner peripheral surface) of the communication pipe 20. A fixed orifice hole 54, that makes the flow path sectional area of the communication pipe 20 smaller locally, is formed in the center of the orifice member 52. The flow of vapor of the communication pipe 20 is inhibited by this fixed orifice hole 54 (but the flow of vapor is not completely impeded). Due thereto, in the state in which the sealing valve 48 is open for example, an intermediate pressure region MS, whose pressure is between the tank internal pressure of the fuel tank 14 and atmospheric pressure, is structured within the communication pipe 20 between the float 44 and the orifice member 52.

In a vicinity of the lower end portion of the communication pipe 20 within the fuel tank 14, the communication pipe 20 is branched-off and a branch pipe 20D is structured. A cut-off valve 56 is provided at the lower end of the branch pipe 20D. The cut-off valve 56 is provided, within the fuel tank 14, at a position that is higher than the full-tank regulating valve 24.

When the tank internal pressure of the fuel tank 14 rises and exceeds a predetermined value, the cut-off valve 56 opens, and vapor within the fuel tank 14 can flow into the canister 18. For example, even if the full-tank regulating valve 24 is closed, vapor within the flow tank 14 can move to the canister 18 due to the cut-off valve 56 being opened. Due thereto, an excessive rise in the tank internal pressure of the fuel tank 14 is suppressed.

Operation of the fuel tank structure 12 of the present embodiment is described next.

In the fuel tank structure 12, the fuel tank 14 can be sealed due to the sealing valve 48 being closed. By sealing the fuel tank 14, vapor that contains evaporated fuel no longer moves toward the canister 18, and therefore, the burden of adsorbing evaporated fuel at the canister 18 can be lessened.

In a case of refueling the fuel tank 14, the refueling operator first pushes the lid opening switch 30. At this time, the control device 32 first sets the sealing valve 48 in an open state, and makes it possible for vapor within the fuel tank 14 to move to the canister 18. Then, in the state in which the tank internal pressure sensor 36 has sensed that the tank internal pressure of the fuel tank 14 has fallen to a predetermined value or less, the control device 32 opens the fuel lid 28. If the fuel lid 28 is open, the refueling operator removes the fuel cap 26 from the refueling port 16H, and refueling is possible.

Here, a fuel tank structure at which the orifice member 52 is not provided (but that is a structure that is substantially the same as the first embodiment other than that) is considered as a comparative example.

In the fuel tank structure of the comparative example, when the sealing valve 48 is open, if the tank internal pressure of the fuel tank is too high, a large amount of vapor attempts to move from the full-tank regulating valve toward the communication pipe. Therefore, there is the concern that the float will be pushed by this vapor and move in the closing direction (upward) and the full-tank regulating valve will close. If the full-tank regulating valve closes, the tank internal pressure within the fuel tank cannot be lowered, and therefore, there is a state in which the lid is not opened by the control device and refueling is impossible.

In contrast, in the fuel tank structure 12 of the present embodiment, the flow path sectional area of the communication pipe 20 is made smaller locally by the orifice member 52 that is provided at the communication pipe 20 between the full-tank regulating valve 24 and the sealing valve 48. Accordingly, flow of the vapor within the communication pipe 20, that moves from the fuel tank 14 to the canister 18, is inhibited. In other words, in the communication pipe 20, the canister 18 side becomes atmospheric pressure (or a pressure close to that), and the intermediate pressure region MS, that is a region of a pressure that is higher than atmospheric pressure and lower than the tank internal pressure, is structured between the orifice member 52 and the float 44. Due thereto, even in a case in which the tank internal pressure is higher than the valve closing pressure of the full-tank regulating valve 24, the difference in pressure above and below the float is small, and a situation in which the full-tank regulating valve 24 closes is suppressed.

Because the fixed orifice hole 54 is formed at the orifice member 52, vapor within the fuel tank 14 gradually passes through the communication pipe 20 and moves to the canister 18. Then, in the state it which it is sensed by the tank internal pressure sensor 36 that the tank internal pressure has fallen to a predetermined value or less, the control device 32 opens the fuel lid 28.

Figure 3:
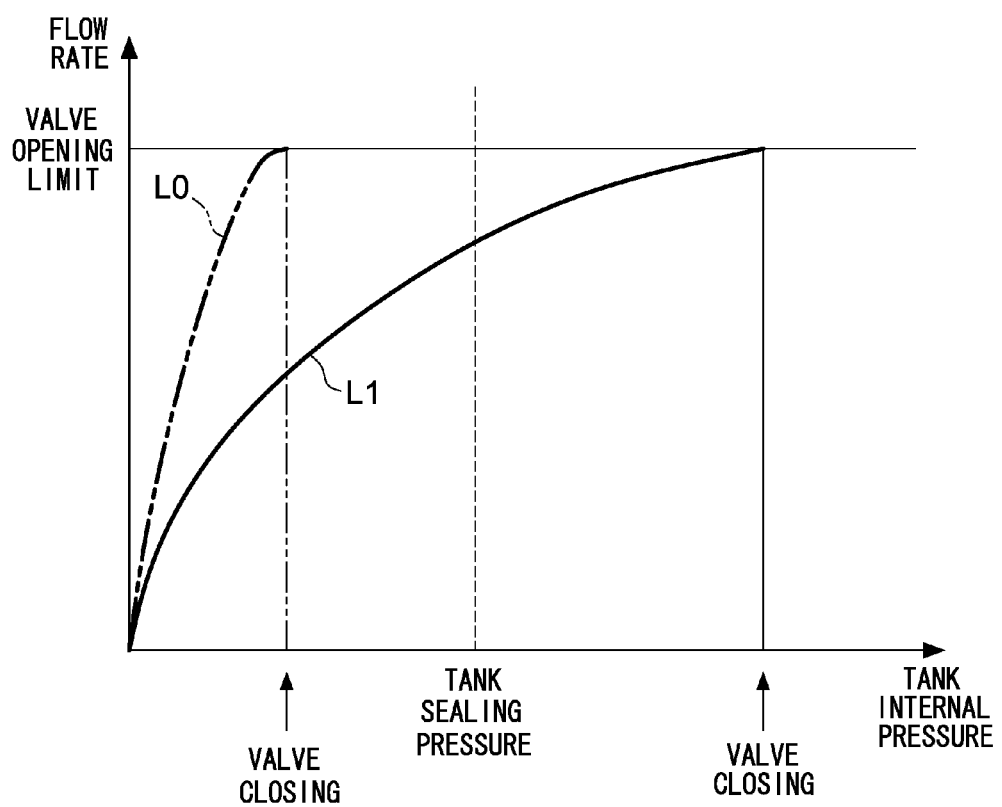
FIG. 3 is a graph qualitatively showing the relationship between tank internal pressure and flow rate in the first embodiment of the present invention.

The relationship between the tank internal pressure of the fuel tank 14 and the flow rate (the amount that flows per unit time) of the vapor that flows from the fuel tank 14 through the communication pipe 20 toward the canister 18 is illustrated qualitatively in FIG. 3. Solid line L1 in FIG. 3 is the case of the first embodiment, and two-dot chain line L0 is the case of the comparative example.

In this graph, "tank sealing pressure" is the threshold value of the tank internal pressure that closes the sealing valve 48 and maintains the fuel tank 14 in a sealed state. When the tank internal pressure sensed by the tank internal pressure sensor 36 is less than or equal to this tank sealing pressure, the control device 32 maintains the sealing valve 48 in the closed state, and, when the tank internal pressure sensed by the tank internal pressure sensor 36 exceeds the tank sealing pressure, the control device 32 opens the sealing valve 48. Further, "valve opening limit" in this graph is the flow rate at which, when the flow rate of vapor that flows through the communication pipe 20 is less than or equal to this valve opening limit, the full-tank regulating valve 24 is open, whereas, at flow rates that exceed the valve opening limit, there is the concern that the full-tank regulating valve 24 will close.

As can be understood from this graph, when the tank internal pressure becomes high, the flow rate also becomes large. In the fuel tank structure of the comparative example, the amount of increase in the flow rate that accompanies the rise in the tank internal pressure is large (suddenly becomes large). In particular, in the example illustrated in this graph, the flow rate reaches the valve opening limit before the tank internal pressure reaches the tank sealing pressure. Further, due to the flow rate reaching the valve opening limit, the pressure difference above and below the float 44 also becomes large, and there is the concern that the full-tank regulating valve 24 will close.

In contrast, in the fuel tank structure 12 of the first embodiment, the substantial flow path sectional area of the communication pipe 20 becomes small locally due to the fixed orifice hole 54. Therefore, even if the tank internal pressure is high, the flow rate is less than in the fuel tank structure of the comparative example. Accordingly, closing of the full-tank regulating valve 24 is suppressed more than in the fuel tank structure of the comparative example. Due to closing of the full-tank regulating valve 24 being suppressed, vapor of the fuel tank 14 flows through the communication pipe 20 to the canister 18, and the tank internal pressure of the fuel tank 14 falls. Then, when the tank internal pressure reaches a predetermined value or less, the control device 32 opens the fuel lid 28, and therefore, the refueling operator removes the fuel cap 26 and refueling of the fuel tank 14 becomes possible.

Note that, also at times other than during refueling, when the tank internal pressure exceeds the tank sealing pressure, it is often the case that the control device 32 is controlled to open the sealing valve 48 (carry out "pressure releasing") in order to suppress an excessive rise in the tank internal pressure. In the fuel tank structure of the comparative example, when the sealing valve 48 is opened in the state in which the tank internal pressure has exceeded the tank sealing pressure, the flow rate exceeds the valve opening limit, and therefore, there is the concern that the full-tank regulating valve will close. In contrast, in the fuel tank structure 12 of the first embodiment, even if the tank internal pressure reaches the tank sealing pressure, the flow rate does not reach the valve opening limit. Because the full-tank regulating valve 24 does not close, vapor within the fuel tank 14 flows from the communication pipe 20 to the canister 18, and the pressure of the fuel tank 14 interior can be decreased.

Note that the opening sectional area of the fixed orifice hole 54 is preferable made to be small, if it is merely in order to limit the flow rate in the state in which the tank internal pressure is high. However, if the opening sectional area is made to be too small, the flow rate of the vapor that moves from the fuel tank 14 to the canister 18 becomes too small, and therefore, in the state in which the full-tank regulating valve 24 is open, a long time is needed for reducing the tank internal pressure and for refueling. Accordingly, it is preferable to set the opening sectional area of the fixed orifice hole 54 such that the flow rate of the communication pipe 20 can be sufficiently ensured at times of reducing the tank internal pressure and at times of refueling, while satisfying the condition that the full-tank regulating valve 24 does not close when the sealing valve 48 is open.

Figure 4:
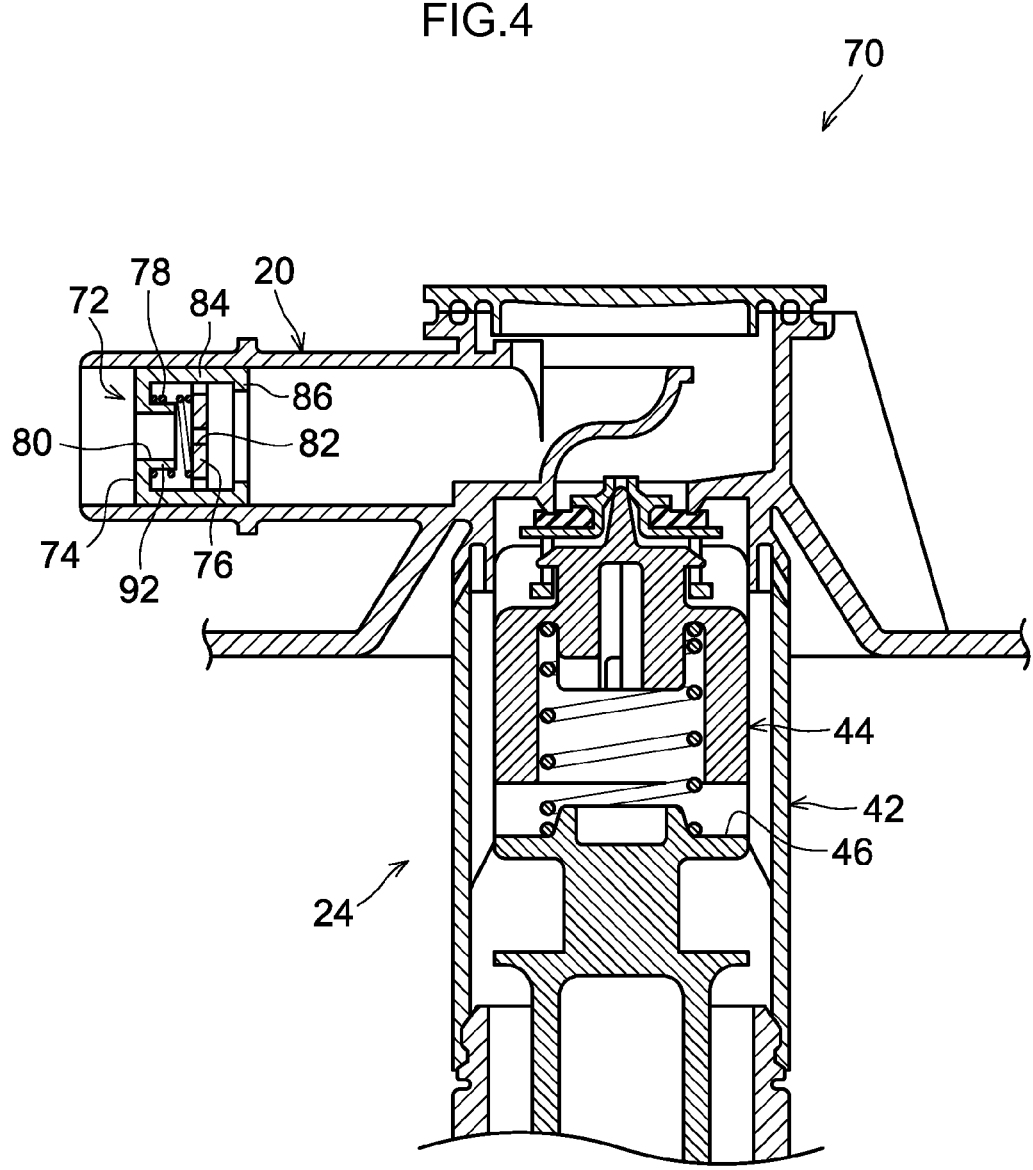
FIG. 4 is a cross-sectional view showing, in an enlarged manner, a full-tank regulating valve of a fuel tank structure of a second embodiment of the present invention, and a vicinity of the full-tank regulating valve.
Figure 5:
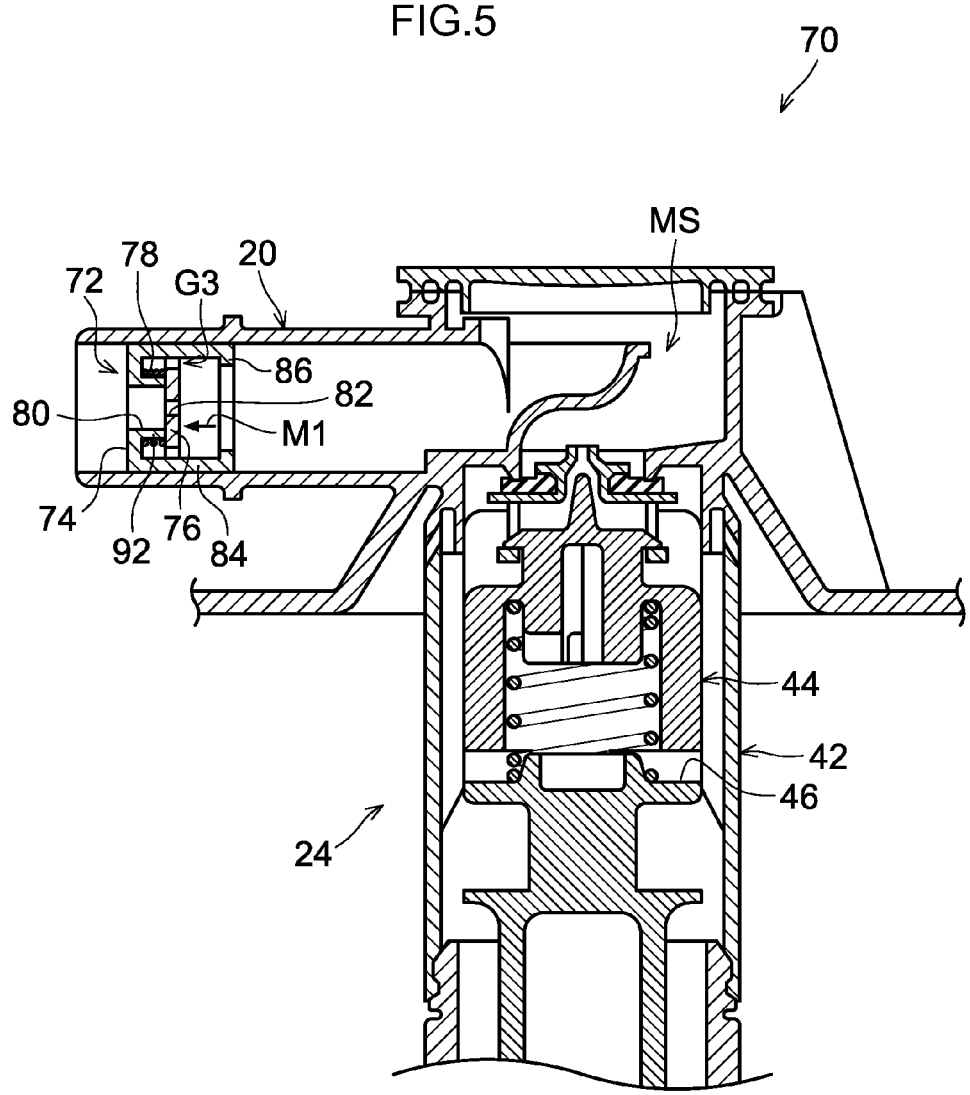
FIG. 5 is a cross-sectional view showing, in an enlarged manner, the full-tank regulating valve of the fuel tank structure of the second embodiment of the present invention, and the vicinity of the full-tank regulating valve.
Figure 6:
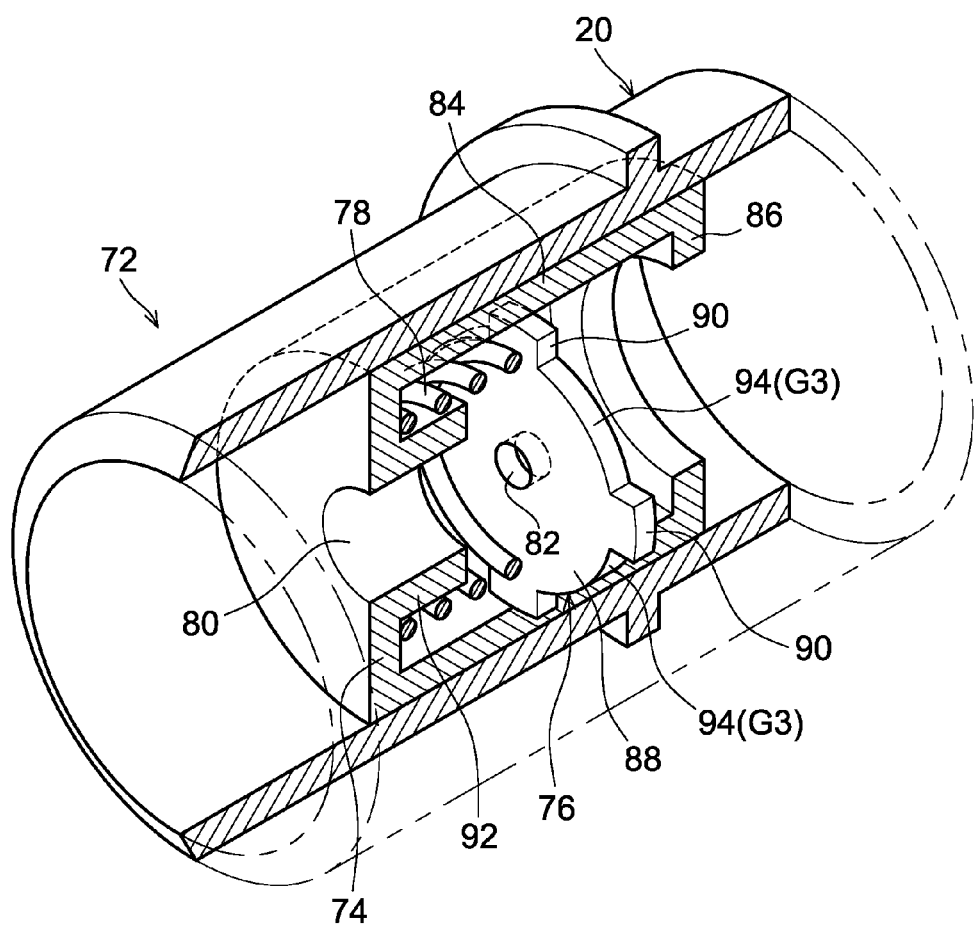
FIG. 6 is a cross-sectional view showing, in a partially enlarged manner, an orifice member of the second embodiment of the present invention, and a vicinity of the orifice member.

A fuel tank structure 70 of a second embodiment of the present invention is illustrated in FIG. 4 and FIG. 5 in a cross-sectional view in which the full-tank regulating valve 24 and the vicinity thereof are enlarged partially. In the second embodiment, the structure of the orifice member differs from that of the first embodiment. An orifice member 72 of the second embodiment is illustrated, together with the communication pipe 20, in a partially-broken enlarged view in FIG. 6.

The orifice member 72 of the second embodiment has a first orifice plate 74, a second orifice plate 76 and a compression coil spring 78. A first orifice hole 80 is formed in the first orifice plate 74. The opening sectional area of the first orifice hole 80 is set such that the flow rate of the communication pipe 20 can be ensured sufficiently at times of refueling the fuel tank 14 or at times of pressure releasing.

A cylindrically tubular extending portion 84, that is cylindrically tubular and that fits tightly to the inner peripheral surface of the communication pipe 20, extends-out from the outer periphery of the first orifice plate 74. Further, a stopper piece 86 that is annular extends-out toward the radial direction inner side from the distal end of the cylindrically tubular extending portion 84.

In contrast, at plural places (four places in the illustrated example) of the outer periphery of a disc portion 88, the second orifice plate 76 is cut out and the diameter thereof reduced, and cut-out portions 94 are formed that pass through the second orifice plate 76 in the plate thickness direction. The cut-out portion 94 is an example of the communicating portion. Further, the portions where the cut-out portions 94 are not formed are plural (four in the illustrated structure) projection pieces 90. The distal ends of the corner pieces 90 contact the inner peripheral surface of the cylindrically tubular extending portion 84.

In this way, due to the regions between the plural corner pieces 90 being made to be the cut-out portions 94 that pass through the second orifice plate 76 in the plate thickness direction, gaps G3 are structured between the second orifice plate 76 and the cylindrically tubular extending portion 84. Further, the second orifice plate 76 can move in the arrow M1 direction and the direction opposite thereto, between the first orifice plate 74 and the stopper piece 86.

The compression coil spring 78 is disposed between the first orifice plate 74 and the second orifice plate 76. The compression coil spring 78 urges the second orifice plate 76 toward the stopper piece 86. The movement of the second orifice plate 76 toward the full-tank regulating valve 24 side is regulated by the corner pieces 90 hitting the stopper piece 86.

The urging force of the compression coil spring 78 is set such that the second orifice plate 76 moves toward the first orifice plate 74 side when the tank internal pressure that is applied to the second orifice plate 76 is a predetermined value (refer to valve closing point TP shown in FIG. 7) that is lower than the tank sealing pressure.

A second orifice hole 82, whose opening sectional area is smaller than that of the first orifice hole 80, is formed in the second orifice plate 76. The second orifice hole 82 also is an example of the communication portion.

Further, a tight-fit piece 92, that is tubular and surrounds the first orifice hole 80, is formed at the first orifice plate 74. When the second orifice plate 76 moves in the arrow M1 direction, the second orifice plate 76 fits tightly to this tight-fit piece 92 (see FIG. 5). In this state, the first orifice hole 80 and the cut-out portions 94 (the gaps G3) are blocked, and therefore, the only place where vapor can move at the orifice member 72 is inside the second orifice hole 82.

Namely, the substantial flow path sectional area of the communication pipe 20 becomes smaller locally due to the second orifice hole 82, and the flow rate from the fuel tank 14 toward the canister 18 is limited. In particular, in the second embodiment, the opening surface area of the second orifice hole 82 is set such that the flow rate does not exceed the valve opening limit of the full-tank regulating valve 24, even if the sealing valve 48 is open in the state in which the tank internal pressure exceeds the tank sealing pressure.

Here, the relationship between tank internal pressure and flow rate in the second embodiment is illustrated qualitatively in FIG. 7. Curve L3 shown by the dashed line in FIG. 7 shows the relationship between tank internal pressure and flow rate in the state in which the second orifice plate 76 fits tightly to the tight-fit piece 92 in this way. Further, curve L4 shown by the two-dot chain line shows the relationship between tank internal pressure and flow rate in the state in which the second orifice plate 76 is apart from the tight-fit piece 92 (see FIG. 4).

Also in the fuel tank structure 70 of the second embodiment that has such a structure, the fuel tank 14 can be sealed by closing the sealing valve 48 (refer to FIG. 1 that illustrates the first embodiment). At this time, vapor does not flow through the communication pipe 20, and no pressure difference arises at the canister 18 side and the fuel tank 14 side of the orifice member 72. Therefore, the second orifice plate 76 is, due to the urging force of the compression coil spring 78, at a position of being apart from the tight-fit piece 92.

When a refueling operator or the like pushes the lid opening switch 30 at the time of refueling the fuel tank 14, the control device 32 sets the sealing valve 48 in an open state. It becomes possible for vapor within the fuel tank 14 to move to the canister 18. At this time, when the tank internal pressure is less than or equal to the valve closing point TP shown in FIG. 7, the second orifice plate 76 does not move toward the first orifice plate 74 side. Because the flow rate does not exceed the valve opening limit of the full-tank regulating valve 24, the full-tank regulating valve 24 does not close, and vapor within the fuel tank 14 moves through the communication pipe 20 toward the canister 18. The relationship between the tank internal pressure and the flow rate at this time is the relationship shown by curve L4 in FIG. 7.

When the tank internal pressure exceeds the valve closing point TP shown in FIG. 7, the second orifice plate 76 that receives the tank internal pressure approaches the first orifice plate 74 against the urging force of the compression coil spring 78, and fits tightly to the tight-fit piece 92. Due thereto, the substantial flow path sectional area of the communication pipe 20 becomes small. As shown by arrow L5 of the two-dot chain line in FIG. 7, the relationship between the tank internal pressure and the flow rate changes to the relationship of curve L3. Further, the flow of the vapor within the communication pipe 20, that moves from the fuel tank 14 to the canister 18, is inhibited. Namely, because the intermediate pressure region MS is structured between the orifice member 72 and the float 44, a situation in which the full-tank regulating valve 24 closes is suppressed.

When vapor within the fuel tank 14 moves through the second orifice hole 82 toward the canister 18, the tank internal pressure of the fuel tank 14 gradually decreases as shown by solid line L6. Then, when the tank internal pressure falls to valve opening point HP shown in FIG. 7, the second orifice plate 76 moves apart from the tight-fit piece 92. Due thereto, the substantial flow path sectional area of the communication pipe 20 becomes large. Therefore, the relationship between the tank internal pressure and the flow rate changes to the relationship shown by curve L4, and smooth movement of vapor from the fuel tank 14 toward the canister 18 becomes possible. Then, in the state in which the tank internal pressure of the fuel tank 14 falls to less than or equal to a predetermined value, the control device 32 opens the fuel lid 28. If the fuel lid 28 is opened, the refueling operator removes the fuel cap 26 from the refueling port 16H and refueling is possible.

Note that, in the fuel tank structure 70 of the second embodiment, also at times other than during refueling, when the tank internal pressure exceeds the tank sealing pressure, it is often the case that the control device 32 is controlled to open the sealing valve 48 (carry out "pressure releasing") in order to suppress an excessive rise in the tank internal pressure. Before the tank internal pressure reaches the tank sealing pressure, the second orifice plate 76 fits tightly to the tight-fit piece 92, and therefore, the full-tank regulating valve 24 does not close. Vapor within the fuel tank 14 flows from the communication pipe 20 to the canister 18, and the pressure of the fuel tank 14 interior can be decreased.

In this way, at the fuel tank structure 70 of the second embodiment, the substantial flow path sectional area of the communication pipe 20 can be switched between a case in which closing of the full-tank regulating valve 24 is suppressed in the state in which the tank internal pressure is high, and a case in which smooth movement of fuel from the fuel tank 14 toward the canister 18 is made possible. Moreover, there is no need for a complex mechanism for changing the flow path sectional area of the communication pipe 20, and there is a highly reliable structure.

Figure 8A:
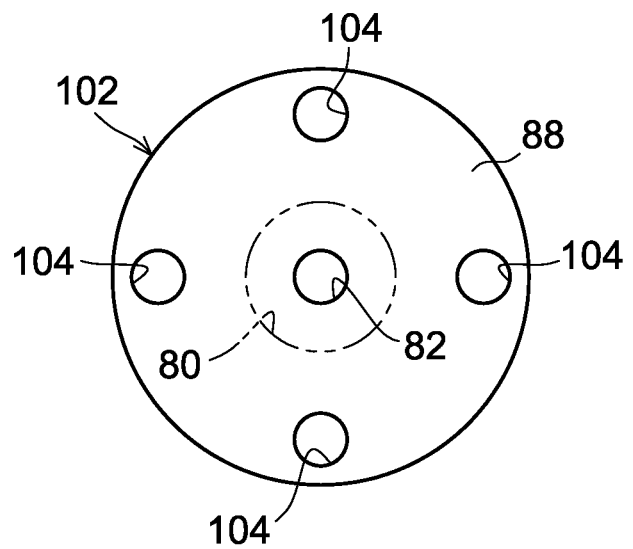
FIG. 8A is a front view showing an example, that is different than that shown in FIG. 6, of the orifice member of the second embodiment of the present invention.

Note that, in the second embodiment, the shape of the second orifice plate is not limited to the above-described shape. For example, as with the second orifice plate 102 shown in FIG. 8A, there may be a structure in which one or plural communication holes 104 are formed in the vicinity of the outer periphery of the disc portion 88. The communication holes 104 are formed further toward the radial direction outer side than the tight-fit piece 92 in the state in which the second orifice plate 102 fits tightly to the tight-fit piece 92, and are examples of the communication portion. Therefore, when the second orifice plate 102 is apart from the tight-fit piece 92, movement of vapor through the communication holes 104 is possible, and the substantial flow path sectional area of the communication pipe 20 becomes large. However, when the second orifice plate 102 fits tightly to the tight-fit piece 92, flowing of vapor through the communication holes 104 is not possible.

Figure 8B:
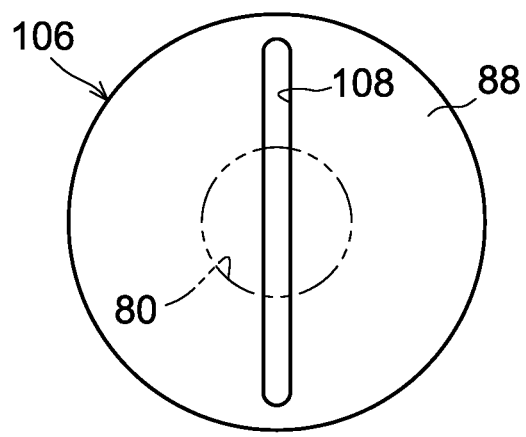
FIG. 8B is a front view showing an example, that is different than those shown in FIG. 6 and FIG. 8A, of the orifice member of the second embodiment of the present invention.

At a second orifice plate 106 shown in FIG. 8B, a long hole 108 is formed along the diameter of the disc portion 88. Portions at the vicinities of the both ends in the length direction of the long hole 108 are formed further toward the radial direction outer side than the tight-fit piece 92 when the second orifice plate 106 fits tightly to the tight-fit piece 92, and are examples of the communication portion. Therefore, when the second orifice plate 106 is apart from the tight-fit piece 92, movement of vapor through the entire long hole 108 is possible, and the substantial flow path sectional area of the communication pipe 20 becomes large. However, when the second orifice plate 106 fits tightly to the tight-fit piece 92, flowing of vapor through the portions at the vicinities of the both ends in the length direction of the long hole 108 is not possible.

Figure 9:
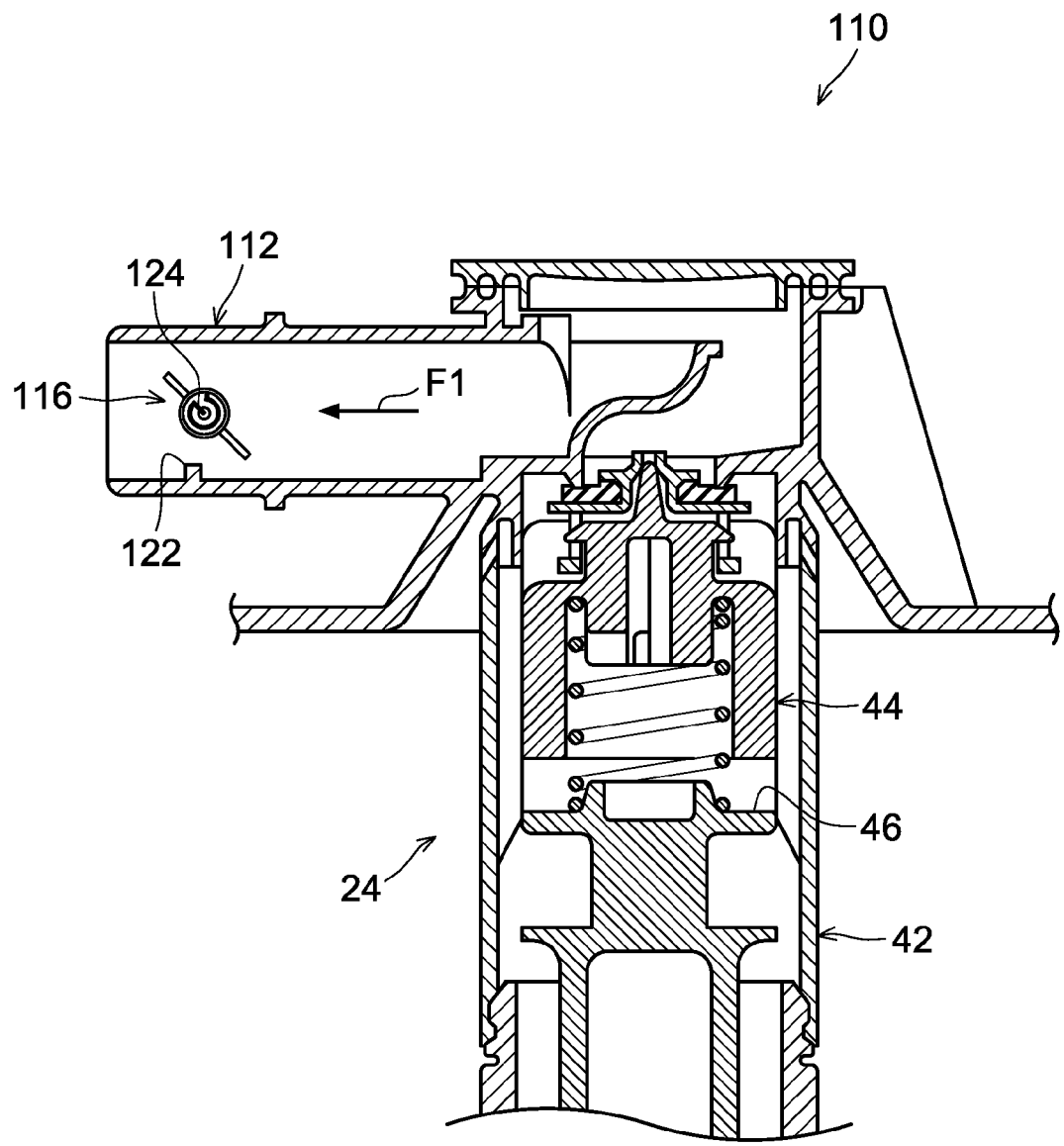
FIG. 9 is a cross-sectional view showing, in an enlarged manner, a full-tank regulating valve of a fuel tank structure of a third embodiment of the present invention, and a vicinity of the full-tank regulating valve.
Figure 10:
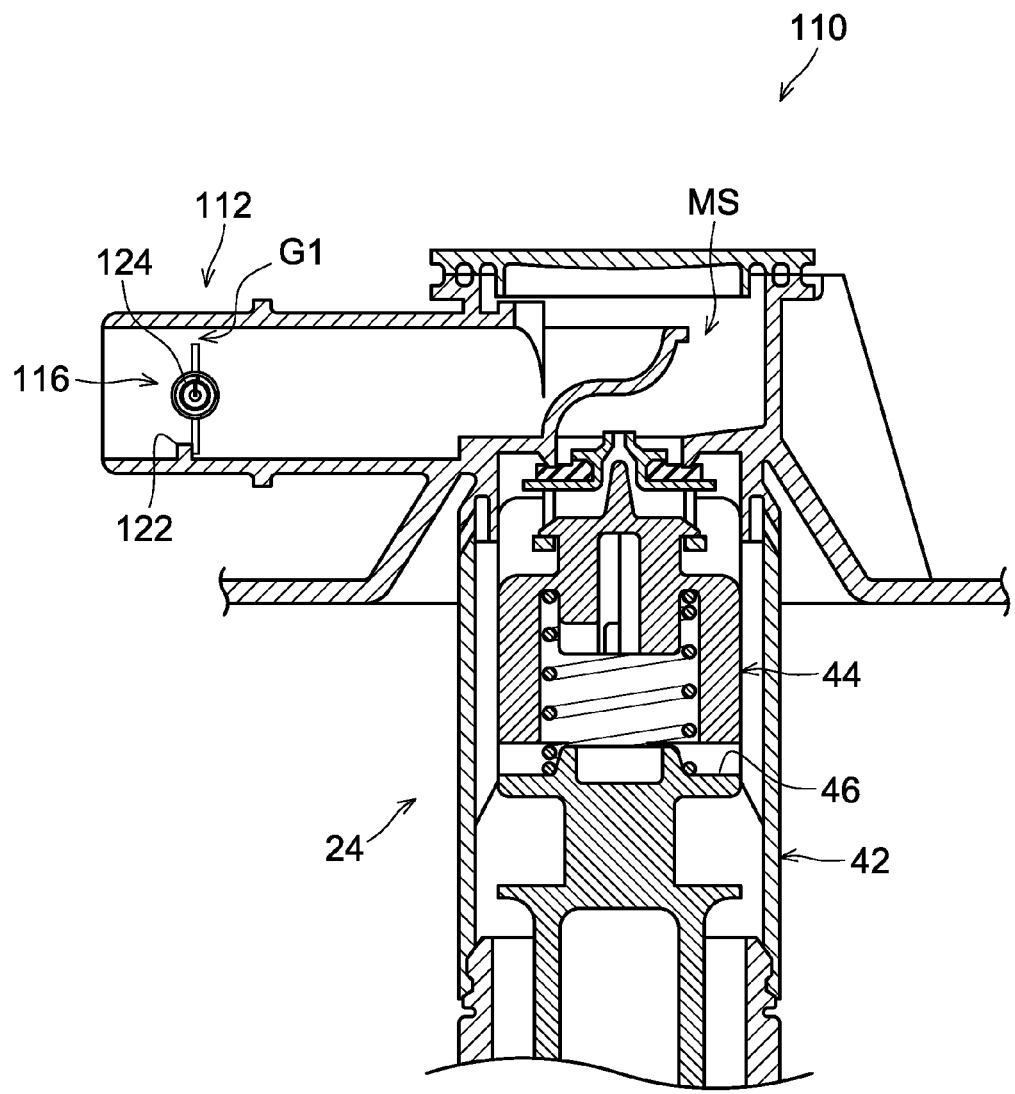
FIG. 10 is a cross-sectional view showing, in an enlarged manner, the full-tank regulating valve of the fuel tank structure of the third embodiment of the present invention, and the vicinity of the full-tank regulating valve.
Figure 11:
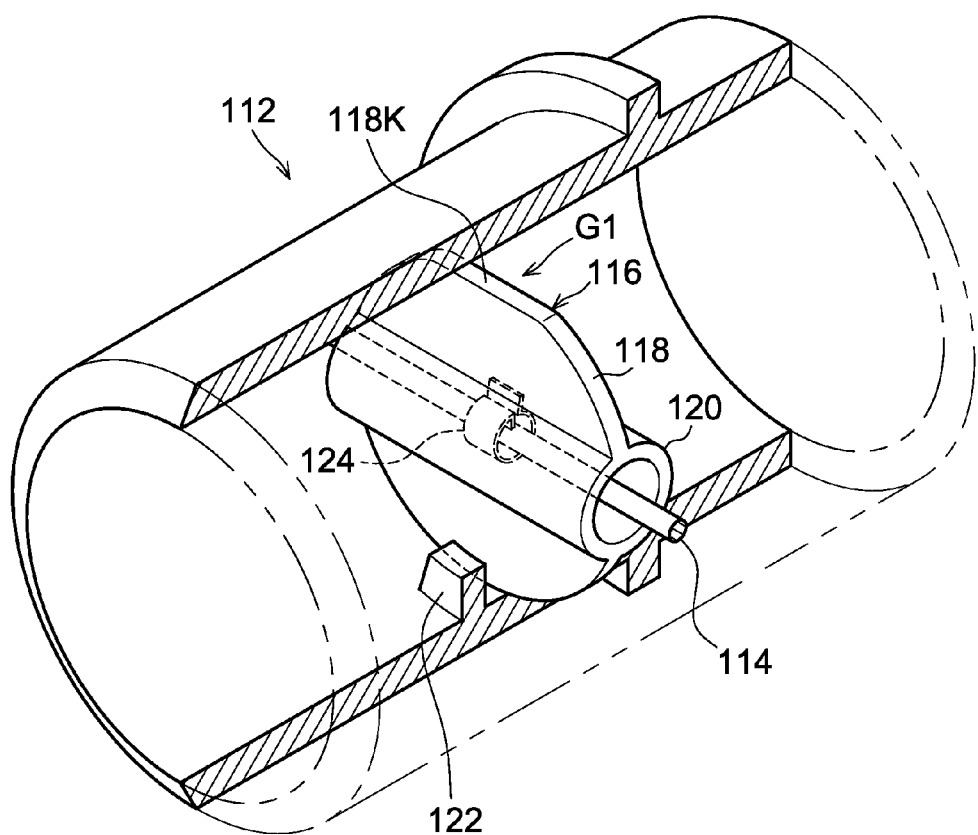
FIG. 11 is a cross-sectional view showing, in a partially enlarged manner, a flow inhibiting member of the third embodiment of the present invention, and a vicinity of the flow inhibiting member.

A fuel tank structure 110 of a third embodiment of the present invention is shown in FIG. 9 and FIG. 10 in cross-sectional views in which the full-tank regulating valve 24 and the vicinity thereof are enlarged partially. In the third embodiment, the structure of the flow inhibiting member differs from those of the first embodiment and the second embodiment. A flow inhibiting member 112 of the third embodiment is shown, together with the communication pipe 20, in a partially broken enlarged view in FIG. 11.

In the third embodiment, a rotating shaft 114 that is orthogonal to the direction in which vapor flows is provided at the interior of the communication pipe 20. A rotating member 116 is rotatably mounted to the rotating shaft 114. The rotating member 116 has a disc portion 118 that is substantially circular and whose diameter is smaller than the inner diameter of the communication pipe 20, and a cylindrical tube portion 120 that is substantially cylindrical tube shaped and that extends in the radial direction of the disc portion 118 at the center of the disc portion 118. As shown in FIG. 9, the rotating member 116 rotates such that the disc portion 118 can move between a valve opening posture at which the disc portion 118 is inclined with respect to the direction of flow of the vapor (the arrow F1 direction), and a valve closing posture at which the disc portion 118 is orthogonal with respect to the direction of flow. This rotation is restricted by a stopper projection 122 that is formed at the inner peripheral surface of the communication tube 20.

A cut-out portion 118K, at which the outer peripheral portion is cut-out rectilinearly, is formed at the disc portion 118. Even if the disc portion 118 is in the valve closing posture, flowing of vapor through a gap G1 that is between the cut-out portion 118K and the communication pipe 20 is possible. However, the flow path sectional area of the communication pipe 20 in this case is smaller than when the disc portion 118 is in the valve opening posture.

In the illustrated example, at the disc portion 118, the surface area of the portion that is further toward the lower side than the cylindrical tube portion 120 is made to be wider than the surface area of the portion at the upper side. Due thereto, rotational force is applied to the rotating member 116 such that the rotating member 116 is set in the valve closing posture by the tank internal pressure that is applied to the rotating member 116.

A spring 124 is interposed between the rotating shaft 114 and the cylindrical tube portion 120, and urges the rotating member 116 to rotate toward the valve opening posture.

Also in the fuel tank structure 110 of the third embodiment that has such a structure, at the time of sealing of the fuel tank 14 due to the closing of the sealing valve 48 (refer to FIG. 1 that illustrates the first embodiment), vapor does not flow through the communication pipe 20. The rotating member 116 is maintained at the valve opening posture due to the urging force of the spring 124.

When a refueling operator or the like pushes the lid opening switch 30 at the time of refueling the fuel tank 14, the control device 32 sets the sealing valve 48 in an open state and makes it possible for vapor within the fuel tank 14 to move to the canister 18. At this time, in a case in which the tank internal pressure has not reached the extent of rotating the rotating member 116 to the valve closing posture, the rotating member 116 is maintained in the valve opening posture. The flow rate does not exceed valve opening limit FM of the full-tank regulating valve 24, and the full-tank regulating valve 24 does not close. Therefore, vapor within the fuel tank 14 moves through the communication pipe 20 toward the canister 18.

When the tank internal pressure is large to the extent of rotating the rotating member 116 toward the valve closing posture, the rotating member 116 rotates toward the valve closing posture against the urging force of the spring 124. Because the substantial flow path sectional area of the communication pipe 20 becomes small, flow of the vapor within the communication pipe 20, that moves from the fuel tank 14 to the canister 18, is inhibited, and a situation in which the full-tank regulating valve 24 closes is suppressed. Further, vapor within the fuel tank 14 moves through the communication pipe 20 to the canister 18, and the tank internal pressure gradually decreases.

When the rotating member 116 enters into the valve opening posture due to a drop in the tank internal pressure of the fuel tank 14, the substantial flow path sectional area of the communication pipe 20 becomes large, and therefore, smooth movement of vapor from the fuel tank 14 toward the canister 18 becomes possible. In the state in which the tank internal pressure of the fuel tank 14 falls to a predetermined value or less, the control device 32 opens the fuel lid 28, and therefore, refueling of the fuel tank 14 is possible.

Note that, in a case of carrying out pressure releasing at the fuel tank structure 110 of the third embodiment, because the tank internal pressure exceeds the tank sealing pressure, when the control device opens the sealing valve 48, the rotating member 116 enters into the valve closing posture, and the full-tank regulating valve 24 does not close. Vapor within the fuel tank 14 flows from the communication pipe 20 to the canister 18, and the pressure of the fuel tank 14 interior can be reduced.

Figure 12:
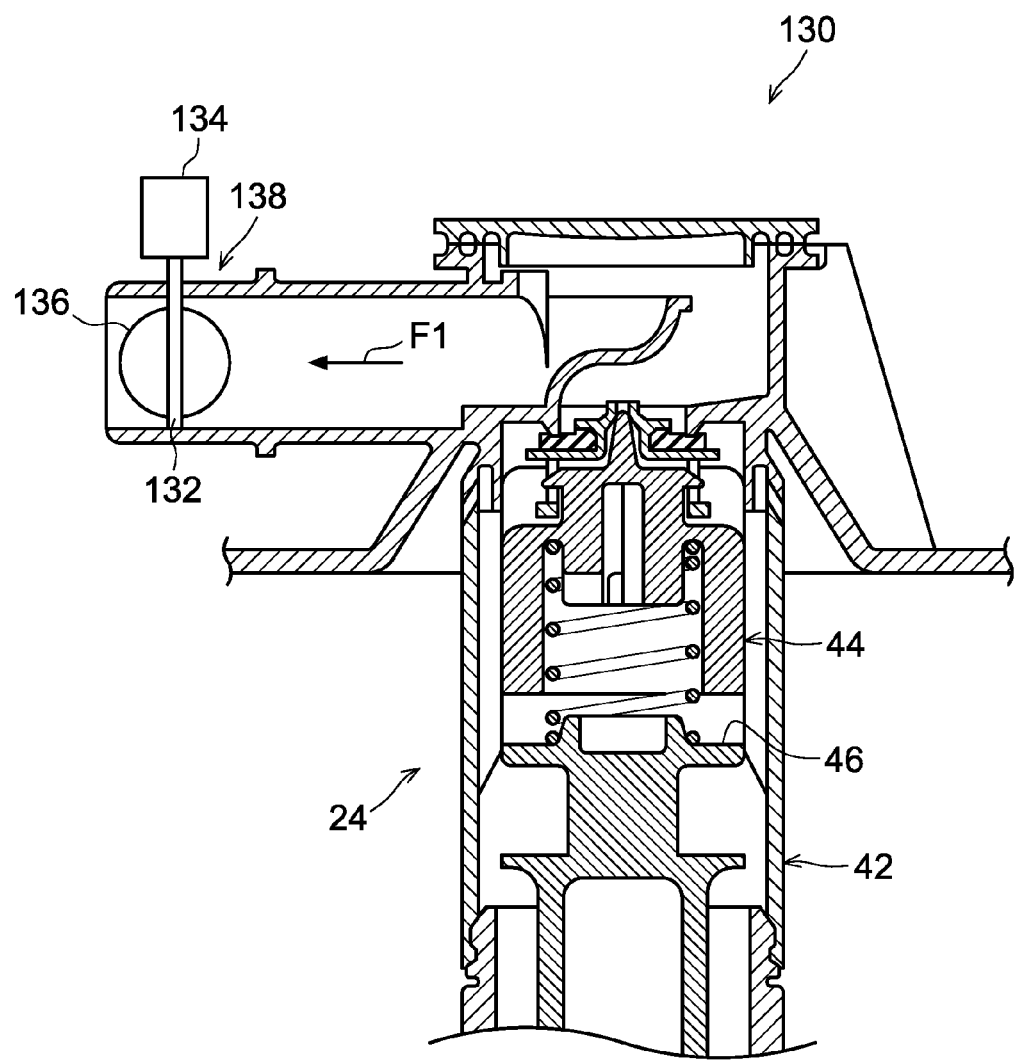
FIG. 12 is a cross-sectional view showing, in an enlarged manner, a full-tank regulating valve of a fuel tank structure of a fourth embodiment of the present invention, and a vicinity of the full-tank regulating valve.
Figure 13:
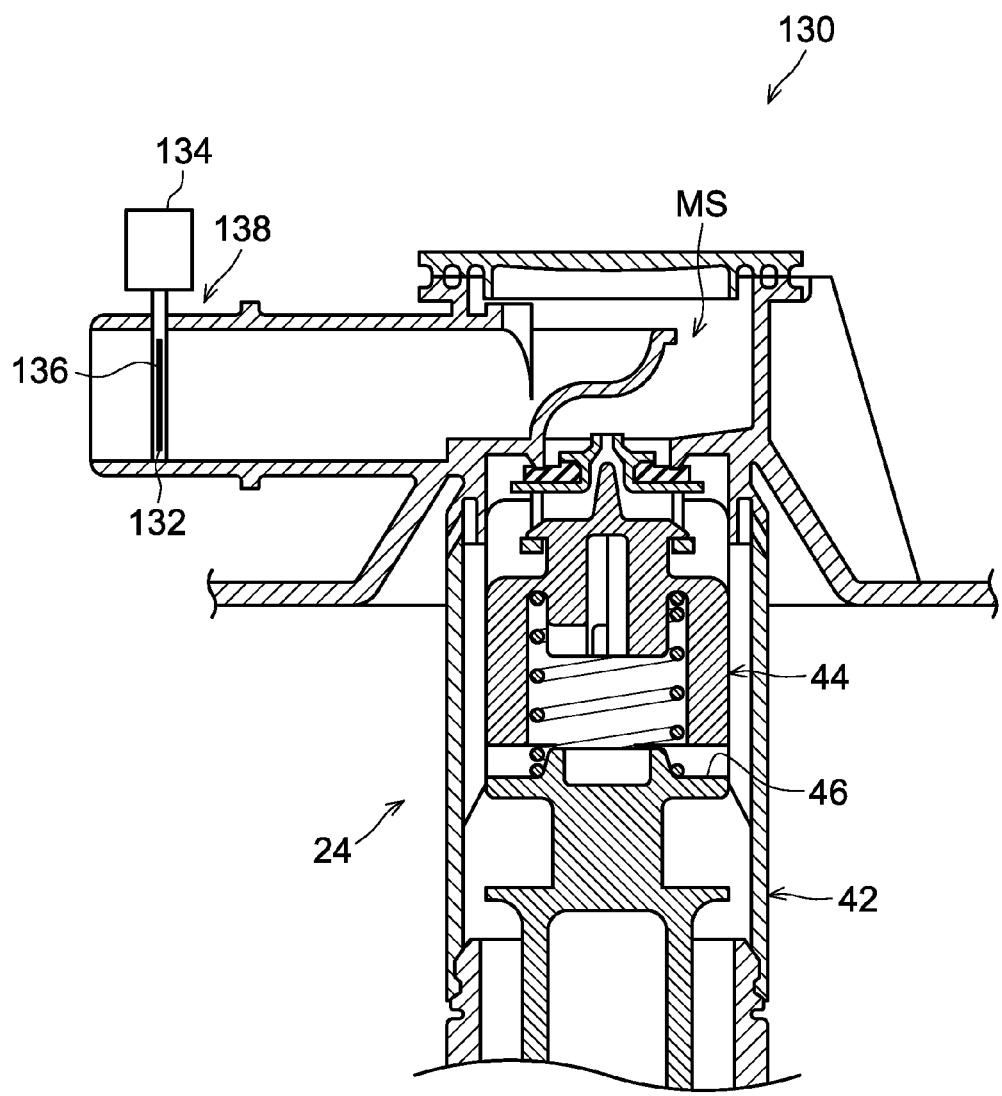
FIG. 13 is a cross-sectional view showing, in an enlarged manner, the full-tank regulating valve of the fuel tank structure of the fourth embodiment of the present invention, and the vicinity of the full-tank regulating valve.

A fuel tank structure 130 of a fourth embodiment of the present invention is shown in FIG. 12 and FIG. 13 in a cross-sectional view in which the full-tank regulating valve 24 and the vicinity thereof are enlarged partially. In the third embodiment, the structure of the flow inhibiting member is different than those of the first embodiment and the second embodiment.

At a flow inhibiting member 138 of the fourth embodiment, a driving shaft 132 in the direction orthogonal to the direction of flow of vapor is provided at the communication pipe 20. One end side of the driving shaft 132 (the upper side in the illustrated example) passes-through the communication pipe 20, and a driving motor 134, that is controlled by the control device 32 (see FIG. 1), is mounted thereto.

A rotating plate 136 that is circular is mounted to the driving shaft 132. The diameter of the rotating plate 136 is made to be slightly smaller than the inner diameter of the communication pipe 20. Further, the rotating plate 136 is rotated by the driving motor 134 so as to be able to assume a valve closing posture (see FIG. 13) in which a normal line of the rotating plate 136 coincides with the direction of flow of vapor of the communication pipe 20 (the arrow F1 direction), and a valve opening posture (see FIG. 12) in which this normal line is inclined with respect to the direction of flow.

In the fuel tank structure 130 of the fourth embodiment that has such a structure, at the time of sealing of the fuel tank 14 due to the closing of the sealing valve 48 (refer to FIG. 1 that illustrates the first embodiment), the rotating plate 136 is maintained in the valve opening posture.

When a refueling operator or the like pushes the lid opening switch 30 at the time of refueling the fuel tank 14, if the tank internal pressure that is sensed by the tank internal pressure sensor 36 has not reached the extent of closing the full-tank regulating valve 24, the control device 32 controls the driving motor 134, and maintains the rotating plate 136 in the valve opening posture as shown in FIG. 12. The flow rate does not exceed the valve opening limit of the full-tank regulating valve 24, and the full-tank regulating valve 24 does not close. Therefore, vapor within the fuel tank 14 moves through the communication pipe 20 toward the canister 18.

When the tank internal pressure is large to the extent of closing the full-tank regulating valve 24, the control device 32 drives the driving motor 134 and rotates the rotating plate 136 to the valve closing posture as shown in FIG. 13. Because the substantial flow path sectional area of the communication pipe 20 becomes small, flow of the vapor within the communication pipe 20, that moves from the fuel tank 14 to the canister 18, is inhibited. Thereafter, the control device 32 sets the sealing valve 48 in an open state and causes vapor within the fuel tank 14 to move to the canister 18, and therefore, a situation in which the full-tank regulating valve 24 closes is suppressed.

When the tank internal pressure of the fuel tank 14 falls and drops beneath the pressure that causes the full-tank regulating valve 24 to close, the control device 32 drives the driving motor 134, and causes the rotating plate 136 to rotate toward the valve opening position as shown in FIG. 12. Because the substantial flow path sectional area of the communication pipe 20 becomes large, smooth movement of vapor from the fuel tank 14 toward the canister 18 becomes possible. In the state in which the tank internal pressure of the fuel tank 14 falls to a predetermined value or less, the control device 32 opens the fuel lid 28, and therefore, refueling of the fuel tank 14 is possible.

Note that, in a case of carrying out pressure releasing at the fuel tank structure 130 of the fourth embodiment, first, in the state in which the control device 32 has set the rotating plate 136 in the valve closing posture, the control device 32 opens the sealing valve 48, and, in a state in which closing of the full-tank regulating valve 24 is suppressed, the pressure of the fuel tank 14 interior is reduced.

Note that a structure in which the length of the communication pipe 20 is made to be long in order to inhibit the flow of the vapor of the communication pipe 20 is also considered. However, if the communication pipe 20 is made to be long, the need to avoid interference with members at the periphery arises, and the degrees of freedom in placement of the fuel tank structure decrease. In the above-described respective embodiments, there is no need to make the communication pipe 20 long, and therefore, there is no need for a structure that avoids interference with members at the periphery, and the degrees of freedom in placement of the fuel tank structure are high.

In the above-described respective embodiments, a structure in which the flow inhibiting member is provided between the canister 18 and the sealing valve 48 can also be considered. However, in particular, by providing the flow inhibiting member between the sealing valve 48 and the full-tank regulating valve 24, the volume of the intermediate pressure region M2 is small, and therefore, there is a structure in which the effect of suppressing closing of the full-tank regulating valve 24 is strong.

The disclosure of Japanese Patent Application No. 2012-259080 filed on Nov. 27, 2012 is in its entirety incorporated by reference into the present Description.

The invention claimed is:

1. A fuel tank structure, comprising:
   a fuel tank that can accommodate fuel internally;
   a canister that adsorbs, by means of an adsorbent, evaporated fuel inside the fuel tank, and that, after adsorption of the evaporated fuel, releases vapor to the atmosphere;
   a full-tank regulating valve that is provided within the fuel tank, and that closes as a result of a float floating in the fuel when a fuel liquid surface within the fuel tank reaches a full-tank liquid level that is set in advance;
   a communication pipe that provides a direct communication path between the fuel tank and the canister, wherein the direct communication path includes the full-tank regulating valve, a flow inhibiting member, and a sealing valve, wherein the full-tank regulating valve, the flow inhibiting member, and the sealing valve are arranged in series on the direct communication path between the fuel tank and the canister;
   the sealing valve is controlled to open and close the communication pipe; and
   the flow inhibiting member inhibits flow of vapor at the communication pipe without completely stopping it, such that while the sealing valve is open, an intermediate pressure region is formed in the communication pipe between the full-tank regulating valve and the flow inhibiting member, the intermediate pressure region having a pressure that is between a tank internal pressure of the fuel tank and atmospheric pressure.

2. The fuel tank structure of claim 1, wherein the flow inhibiting member comprises a variable mechanism that can change a flow path sectional area of the communication pipe.

3. The fuel tank structure of claim 2, wherein the flow inhibiting member comprises an orifice member that locally reduces the flow path sectional area of the communication pipe.

4. The fuel tank structure of claim 3, wherein:
   the orifice member comprises:
   a first orifice plate that is fitted tightly to an inner portion of the communication pipe, and that has a first orifice hole whose inner diameter is smaller than an inner diameter of the communication pipe; and
   a second orifice plate that is disposed further toward the full-tank regulating valve side than the first orifice plate, and that, when contacting the first orifice plate, blocks a portion of the first orifice hole, and that has one or more communication portions of which a portion is blocked in a state in which the second orifice plate contacts the first orifice plate; and
   the variable mechanism comprises an urging member that urges the second orifice plate toward the full-tank regulating valve side so as to move the second orifice plate away from the first orifice plate, and that, due to tank internal pressure of a predetermined value or greater that is applied from the fuel tank to the second orifice plate, can move the second orifice plate toward the first orifice plate side.

* * * * *